(12) United States Patent
Hirabayashi

(10) Patent No.: US 6,188,726 B1
(45) Date of Patent: *Feb. 13, 2001

(54) CODING/DECODING APPARATUS

(75) Inventor: Yasuji Hirabayashi, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/733,788

(22) Filed: Oct. 18, 1996

Related U.S. Application Data

(63) Continuation of application No. 08/259,185, filed on Jun. 13, 1994, now abandoned.

(30) Foreign Application Priority Data

Jun. 24, 1993 (JP) .................................................. 5-153640

(51) Int. Cl.[7] .................................................. H04N 7/12
(52) U.S. Cl. .................................................. 375/240.03
(58) Field of Search .................. 375/240.01, 240.03, 375/240.08; 348/384.1, 390.1, 402.1, 401.1, 405.1, 407.1, 412.1, 413.1, 415.1, 416.1, 699; 386/111; 382/236, 238, 243

(56) References Cited

U.S. PATENT DOCUMENTS

| | | | |
|---|---|---|---|
| 4,591,909 | * | 5/1986 | Kuroda et al. .................. 348/415 |
| 4,636,862 | * | 1/1987 | Hatori et al. .................. 348/420 |
| 4,689,671 | * | 8/1987 | Ohki et al. .................. 348/416 |
| 4,703,347 | * | 10/1987 | Yasuda et al. .................. 348/150 |
| 4,802,006 | * | 1/1989 | Iinuma et al. .................. 348/412 |
| 4,833,535 | * | 5/1989 | Ozeki et al. .................. 348/400 |
| 5,057,940 | * | 10/1991 | Murakami et al. .................. 358/426 |
| 5,097,327 | * | 3/1992 | Hasebe .................. 348/25 |
| 5,193,003 | * | 3/1993 | Kondo .................. 348/409 |
| 5,196,933 | * | 3/1993 | Henot .................. 348/419 |
| 5,237,410 | * | 8/1993 | Inoue .................. 348/409 |
| 5,247,590 | * | 9/1993 | Fukuhara et al. .................. 382/243 |
| 5,260,782 | * | 11/1993 | Hui .................. 348/416 |
| 5,262,856 | * | 11/1993 | Lippman et al. .................. 348/416 |
| 5,267,333 | * | 11/1993 | Aono et al. .................. 382/166 |
| 5,274,453 | * | 12/1993 | Maeda .................. 348/409 |

FOREIGN PATENT DOCUMENTS

| | | | | |
|---|---|---|---|---|
| 362012287A | * | 1/1987 | (JP) | .................. H04N/7/12 |
| 362123834A | * | 6/1987 | (JP) | .................. H03M/7/42 |
| 362159050A | * | 7/1987 | (JP) | .................. G01P/3/36 |
| 401154691A | * | 6/1989 | (JP) | .................. H04N/7/12 |
| 402241285A | * | 9/1990 | (JP) | .................. H04N/7/14 |
| 403241993A | * | 10/1991 | (JP) | .................. H04N/11/04 |
| 404287486A | * | 10/1992 | (JP) | .................. H04N/5/92 |

* cited by examiner

Primary Examiner—Vu Le
(74) Attorney, Agent, or Firm—Robin, Blecker & Daley

(57) ABSTRACT

A coding apparatus is arranged to eliminate predetermined image data from input image data and code the input image data from which the predetermined image data is eliminated. A decoding apparatus is arranged to decode the coded image data from which the predetermined image data is eliminated and combine desired image data with the decoded image data.

13 Claims, 2 Drawing Sheets

CODING/DECODING APPARATUS

This is a continuation application under 37 CFR 1.62 of prior application Ser. No. 08/259,185, filed Jun. 13, 1994, now abandoned.

BACKGROUND OF THE INVENTION

1. Field of the Invention

The present invention relates to a coding/decoding apparatus capable of achieving highly efficient coding of input image data.

2. Description of the Related Art

Moving image coding methods are classified into three representative methods: an interframe differential coding method; a motion compensation interframe differential coding method and an intraframe coding method. In practice, one picture is divided into a plurality of blocks, and such a moving image coding method is applied to each of the blocks.

The interframe differential coding method is intended to code the difference between a block to be coded and a block which occupies a spatially identical position in the previous frame. Since the stronger the correlation between frames, the closer to zero the difference value between the blocks, the interframe differential coding method can achieve a higher compression ratio for a lower-activity image.

The motion compensation interframe differential coding method is a modification of the interframe differential coding method into which motion compensation is introduced. In the motion compensation interframe differential coding method, a difference value is found between a block contained in one frame and the most approximate block selected from among neighboring blocks surrounding a block which occupies a spatially identical position in the previous frame, and the difference value is coded.

For example, difference data is subjected to discrete cosine transform, and after the resultant transform coefficient is quantized, Huffman coding is performed. Even if a moving object is present in a picture, the difference value obtained from the moving object can be made small. Accordingly, the motion compensation interframe differential coding method can achieve a high compression ratio even for a high-activity image.

The intraframe coding method is intended to perform coding within only a single picture. Specifically, an image of interest is directly subjected to discrete cosine transform, and after the resultant transform coefficient is quantized, Huffman coding is performed. If either of the aforesaid difference-value coding methods, i.e., the interframe differential coding method or the motion compensation interframe differential coding method, is employed with an interframe correlation small, the process of finding the difference value causes an increase in a dynamic range, and the amount of information to be processed increases. The intraframe coding method does not involve such a problem.

The intraframe coding method is suited to coding of an image immediately after a scene change, whereas the motion compensation interframe differential coding method is best suited to coding of ordinary low-activity moving images.

However, in the motion compensation interframe differential coding method, if a still background is contained in a block, a detection error occurs and the compression ratio is lowered. More specifically, a matching computation for detection of a motion vector is performed on the assumption that the still background is relatively moving with respect to a moving object. As a result, if the moving object and the background prevail in each block, the effect of motion compensation decreases and, in the worst case, serves as an impairment factor. In other words, if an accurate motion compensation is applied to a moving object, the motion compensation is performed on the assumption that a background image is moving, and this process of the motion compensation increases the amount of generated codes.

SUMMARY OF THE INVENTION

An object of the present invention which has been made in the light of the above-described background is to provide a coding/decoding apparatus capable of highly efficiently coding any kind of input image data.

To achieve the above object, in accordance with one aspect of the present invention, there is provided a coding apparatus which comprises inputting means for inputting image data, extracting means for extracting predetermined image data from the input image data, and coding means for coding the predetermined image data extracted by the extracting means.

In accordance with another aspect of the present invention, there is provided a decoding apparatus which comprises decoding means for decoding, into a moving image, moving image information formed by coding only a non-background portion, background memory means for storing a background image, and combining means for combining the background image outputted from the background memory means with the moving image outputted from the decoding means.

Other objects, features and advantages of the present invention will become apparent from the following detailed description taken in conjunction with the accompanying drawings.

DETAILED DESCRIPTION OF THE PREFERRED EMBODIMENT

A preferred embodiment of the present invention will be described below with reference to the accompanying drawings. By way of example, in the following description, reference will be made to a video conference system which includes a moving image transmitting apparatus for coding a moving image in which only a person moves against a still background image into data compressed at a high compression ratio and transmitting the coded data, and a moving image receiving apparatus for decoding and reproducing the coded data transmitted from the transmitting apparatus.

Figure 1:
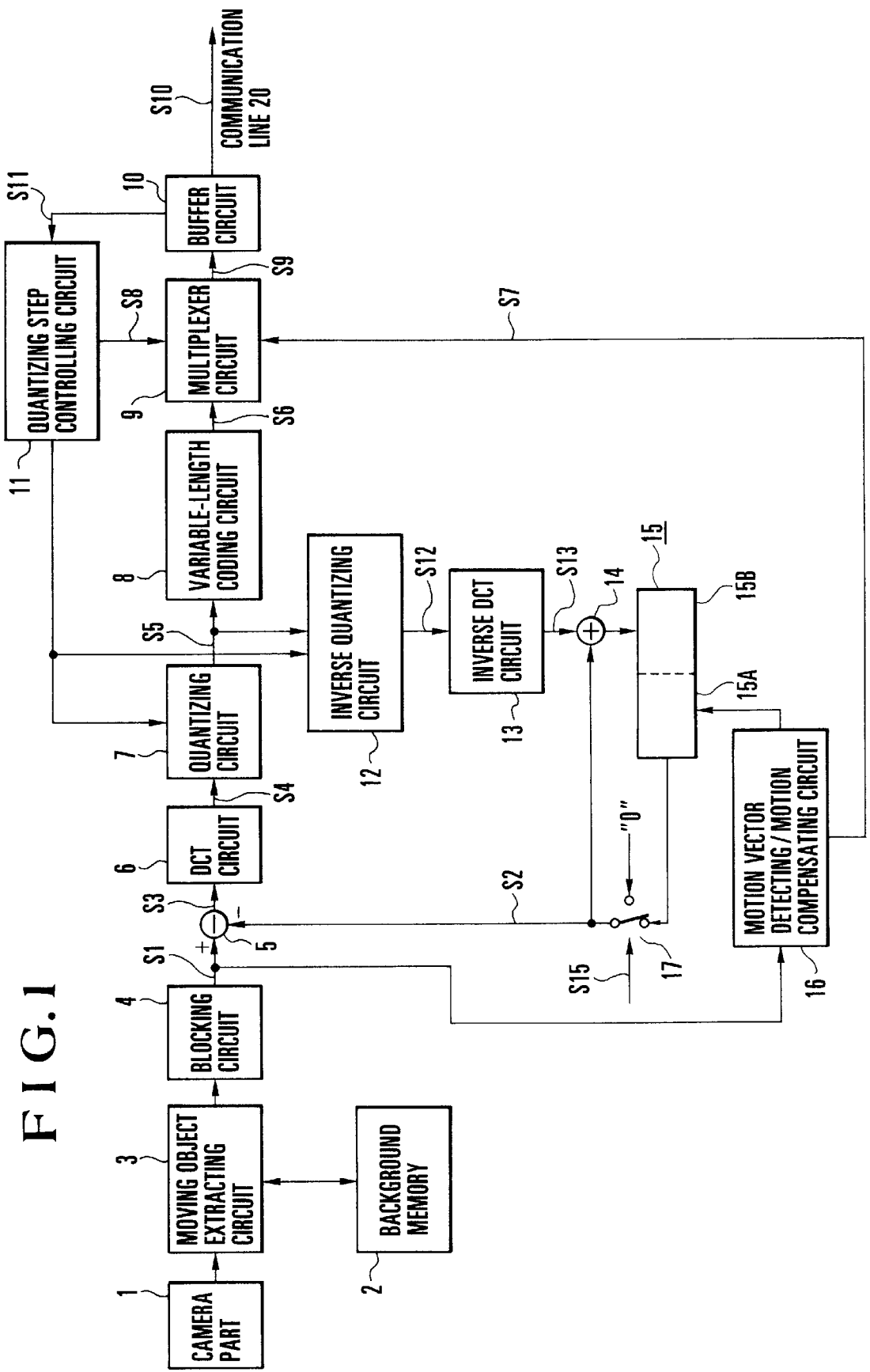
FIG. 1 is a block diagram schematically showing a moving image transmitting apparatus according to one embodiment of the present invention.

FIG. 1 is a block diagram of the moving image transmitting apparatus according to one embodiment of the present invention.

Referring to FIG. 1, a camera part 1 photographs an image to be transmitted. Image data outputted from the camera part 1 is digital image data.

Incidentally, a background image is photographed in advance by the camera part 1 and is previously stored in a background memory 2 as still image data.

The still image data is luminance data represented in an 8-bit range, and use of a value of 0 is inhibited. Specifically, a pixel having a value of 0 is set to, for example, "1", and stored in the background memory 2.

The background image photographed in advance is also previously transmitted to a receiving side which will be described later.

A moving object extracting circuit 3 makes a comparison between the background image stored in the background memory 2 and the photographed image transmitted from the camera part 1, and extracts a portion which shows a change greater than or equal to a predetermined magnitude.

In the present embodiment, matching is performed between the background image stored in the background memory 2 and the background image contained in the photographed image transmitted from the camera part 1, and a moving object (in the present embodiment, a person image) is extracted. Thus, the moving object extracting circuit 3 provides an output consisting of only the person image, which is surrounded by values of 0s.

The image data outputted from the moving object extracting circuit 3 is divided into blocks of (8×8) pixels by a blocking circuit 4.

Image data S1 blocked by the blocking circuit 4 is inputted to a difference circuit 5.

Further, previous frame image data S2 relative to the previous frame is inputted from a frame memory 15 to the difference circuit 5 through a selecting switch 17.

The difference circuit 5 finds the difference between the input image data S1 and the previous frame image data S2 and generates difference data S3, and outputs the difference data S3 to a DCT (discrete cosine transform) circuit 6.

The DCT circuit 6 performs discrete cosine transform of the difference data S3 in units of minute blocks by using two-dimensional image correlations, and outputs the resultant transform data S4 to a quantizing circuit 7.

The quantizing circuit 7 quantizes the transform data S4 in quantizing steps controlled in a manner which will be described later, and outputs quantized data S5 to both a variable-length coding circuit 8 and an inverse quantizing circuit 12.

The variable-length coding circuit 8 performs variable-length coding of the quantized data S5, and outputs the resultant variable-length coded data S6 to a multiplexer circuit 9.

The multiplexer circuit 9 performs multiplexing of motion vector data S7 outputted from a motion vector detecting/motion compensating circuit 16, the variable-length coded data S6, and quantizing step control data S8 outputted from a quantizing step controlling circuit 11.

Figure 2:
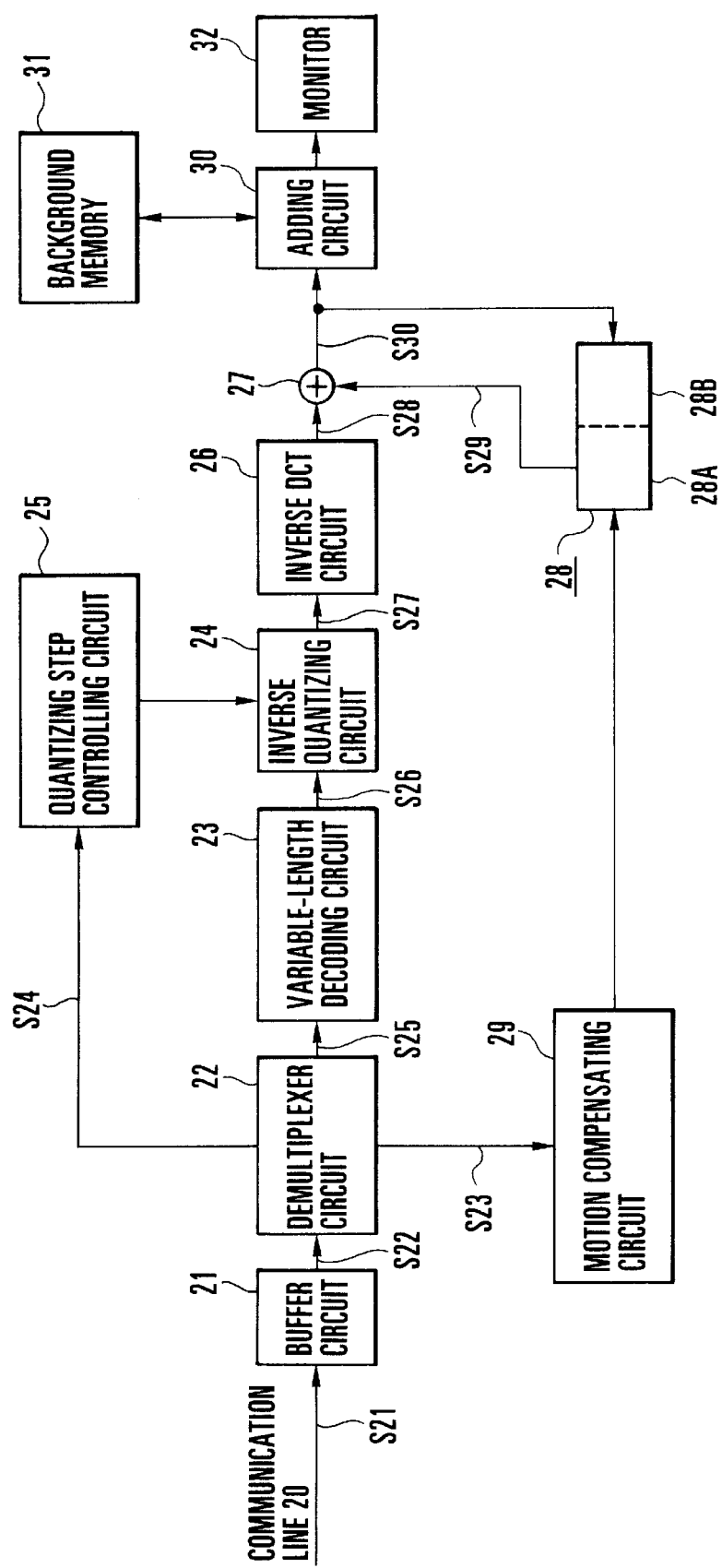
FIG. 2 is a block diagram schematically showing a moving image receiving apparatus according to one embodiment of the present invention.

Multiplexed data S9 outputted from the multiplexer circuit 9 is outputted from a buffer circuit 10 as transmission data S10, and is transmitted over a communication line 20 to the receiving side shown in FIG. 2.

The buffer circuit 10 also outputs information data S11 indicative of the amount of data accumulated in the buffer circuit 10 to the quantizing step controlling circuit 11.

The quantizing step controlling circuit 11 controls the quantizing step of each of the quantizing circuit 7 and the inverse quantizing circuit 12 on the basis of the input information data S11.

Also, the quantizing step controlling circuit 11 outputs to the multiplexer circuit 9 the quantizing step control data S8 which is used to control the quantizing step of each of the quantizing circuit 7 and the inverse quantizing circuit 12.

The moving image transmitting apparatus has a local decoding circuit part so that the quantized data S5 to be transmitted as the transmission data S10 can be locally decoded and supplied to the frame memory 15.

The local decoding circuit part will be specifically described below.

The quantized data S5 is inversely quantized by the inverse quantizing circuit 12 in the quantizing steps controlled in the above-described manner. The inverse quantizing circuit 12 outputs the inversely quantized data S12 to an inverse DCT circuit 13.

The inverse DCT circuit 13 transforms the inversely quantized data S12 into decoded image data S13 by means of the completely inverse transforming processing of that performed by the DCT circuit 6, and outputs the decoded image data S13 to an adding circuit 14.

The adding circuit 14 adds together the previous frame image data S2 fed back by the frame memory 15 and the decoded image data S13, restores the image data outputted as the transmission data S10, and sequentially stores the transmission data S10 in the frame memory 15.

The frame memory 15 includes a frame memory 15A for storing local decoded data relative to the previous frame and a frame memory 15B to which to write current data.

Further, the moving image transmitting apparatus supplies the input image data S1 to the motion vector detecting/motion compensating circuit 16. The motion vector detecting/motion compensating circuit 16 reads out the image data relative to the previous frame which is stored in the frame memory 15 as the image data S1, and detects a motion vector by performing a matching computation on the read-out image data and the image data S1 inputted from the blocking circuit 4. The motion vector detecting/motion compensating circuit 16 causes the frame memory 15 to output the previous frame image data S2 which is prediction data for use in performing a motion compensation on the basis of the detected motion vector.

Further, the motion vector detecting/motion compensating circuit 16 outputs the detected motion vector data S7 to the multiplexer circuit 9.

Incidentally, if a background image or the first image is to be transmitted, since there is no image data to which reference is to be made, it is necessary to substitute "0" for the value of the previous frame image data S2. For this reason, in the present embodiment, the selecting switch 17 is provided so that either one of the image data read out from the frame memory 15 and "0" can be selected. The selecting operation of the selecting switch 17 is controlled in accordance with control data S15 outputted from a control circuit (not shown).

The moving image receiving apparatus for receiving the image data coded by and transmitted from the apparatus of FIG. 1 and reproducing an image will be described below with reference to FIG. 2.

FIG. 2 is a block diagram showing the moving image receiving apparatus according to the present embodiment.

Referring to FIG. 2, image data S21 transmitted over the communication line 20 is inputted to a demultiplexer circuit 22 through a buffer circuit 21 as reproduction image data S22.

The demultiplexer circuit 22 forms difference image information data S25 by separating motion vector data S23 and quantizing step control data S24 from the reproduction image data S22, and supplies the difference image information data S25 to a variable-length decoding circuit 23.

The variable-length decoding circuit 23 decodes the difference image information data S25 into decoded image data S26 which corresponds to the quantized data S5 coded by the variable-length coding circuit 8 (refer to FIG. 1).

An inverse quantizing circuit 24 inversely quantizes the decoded image data S26 in quantizing steps controlled by a quantizing step controlling circuit 25, thereby forming inversely quantized data S27.

Incidentally, the quantizing step controlling circuit 25 controls the quantizing step of the inverse quantizing circuit 24 on the basis of the quantizing step control data S24 outputted from the demultiplexer circuit 22.

The inversely quantized data S27 is transformed into decoded image data S28 by an inverse DCT circuit 26 in accordance with the completely inverse transforming process of that performed by the DCT circuit 6 (refer to FIG. 1), and the decoded image data S28 is outputted to an adding circuit 27.

The adding circuit 27 adds the decoded image data S28 to motion compensation data S29 read out from a frame memory 28, forms decoded image data S30, and feeds the decoded image data S30 back to the frame memory 28.

The demultiplexer circuit 22 also supplies to a motion compensating circuit 29 the motion vector data S23 separated from the reproduction image data S22.

When the motion vector data S23 is inputted to the motion compensating circuit 29, the motion compensating circuit 29 controls the reading operation of the frame memory 28 on the basis of the motion vector data S23, thereby causing the frame memory 28 to output the motion compensation data S29.

S1milarly to the frame memory 15 (refer to FIG. 1), the frame memory 28 includes a frame memory 28A for storing decoded values relative to the previous frame and a frame memory 28B to which to write current data.

The decoded image data S30 is also inputted to an adding circuit 30. A background image previously transmitted from the transmitting side (normally, a background image identical to that stored in the background memory 2 (refer to FIG. 1)) is stored in a background memory 31, and the background image data is outputted to the adding circuit 30.

The adding circuit 30 substitutes the background image data read out from the background memory 31 for the zero valued portion of the received image, and outputs the resultant image to a monitor 32.

In the above-described manner, a picture is formed in which the person image transmitted as a moving image is superimposed on the still background image, and the picture is displayed on the screen of the monitor 32.

In the above-described embodiment, it is not necessary that the background image stored in the background memory 2 on the transmitting side be identical to the background image stored in the background memory 31 on the receiving side. This feature of the above-described embodiment is useful, for example, in a case where an operator does not desire to transmit an actual background image or desires to transmit a person image superimposed on a different particular background image.

In such a case, by transmitting filed images or different location images to the receiving side as background images and store these background images in the background memory 31, the operator can select a desired background image from among the plurality of background images. If a file of background image information to be used is provided on the receiving side, it is preferable to adopt an arrangement for specifying a code for designating a desired background image before transmission of a moving image.

The background memory 2 stores image information on the basis of which a background image is eliminated from a photographed image transmitted from the camera part 1. The background within the photographic field of view of the camera part 1 varies subtly or greatly with a camera shake, panning or zooming. To cover a predictable range of variations, the background memory 2 is preferably capable of storing image data corresponding to an area wider than the area of one normal picture. If an arrangement for making reference to operation information about the camera part 1 (such as zooming, focal length, panning angle and tilting angle) is adopted, the moving object extracting circuit 3 can readily extract the portion of a moving object (in the present embodiment, the person).

As is readily understood from the foregoing description, in accordance with the present embodiment, it is possible to greatly reduce the number of codes required for the transmission of a moving image. Further, since an arbitrary background can be selected, the present embodiment is very useful when an operator desires to hide an actual background of the transmitting side or to use a particular background.

Incidentally, it is possible to practice the present invention in various other forms without departing from the spirit and primary features thereof.

For example, although the description of the present embodiment has referred to the coding method using the DCT circuit, the quantizing circuit and the variable-length coding, the present invention is not limited to such a coding method.

The present invention can also be applied to a case where an image which contains a stationary background image is transmitted or received, such as a videotelephone system.

In other words, the foregoing description of the embodiment has been given for illustrative purposes only and should not be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. A coding apparatus comprising:
   a) input means for inputting independent background image data corresponding to a predetermined background image and image data obtained by picking up an object with the predetermined background image;
   b) extracting means for extracting object image data corresponding to the object portion from the image data by using independent background image data; and
   c) coding means for motion compensation interpicture coding the object image data extracted by said extracting means, wherein the motion compensation interpicture coding performs motion compensation between the object image data of a present picture and the object image data of a picture other than the present picture.

2. A coding apparatus according to claim 1, further comprising image pickup means for inputting an image.

3. A coding apparatus according to claim 1, wherein said coding means includes:
   a) orthogonal transformation means for orthogonally transforming the input image data processed by said extracting means;
   b) quantizing means for quantizing the orthogonally transformed image data; and c) variable-length coding means for performing variable-length coding of the quantized image data.

4. A coding apparatus according to claim 3, wherein said coding means further includes a buffer memory for storing the image data coded by the variable-length coding, a quantizing step of said quantizing means being controlled in accordance with an amount of data accumulated in the buffer memory.

5. A coding apparatus according to claim 1, wherein said coding means performs intrapicture coding of the object image data.

6. A coding apparatus according to claim 1, wherein said coding means performs intrapicture coding of independent background image data.

7. A coding apparatus according to claim 1, wherein said coding means codes independent background image data.

8. A coding apparatus according to claim 7, further comprising output means for outputting the object image data and independent background image data coded by said coding means.

9. A decoding apparatus comprising:
   a) input means for inputting coded image data, which have been obtained by extracting object image data from image data and coding the extracted object image data by motion compensation interpicture coding, which performs motion compensation between the object image data of a present picture, and the object image data of a picture other than the present picture, the image data being data obtained by picking up an object with a predetermined background image, and the object image data being extracted from the image data by using an independent background image data corresponding to the predetermined background image obtained prior to the extraction process; and
   b) decoding means for decoding the image data inputted by said input means.

10. A decoding apparatus according to claim 9, further comprising:
    a) memory means for storing the background image data; and
    b) combining means for combining the image data decoded by said decoding means with the background image data stored in said memory means.

11. A decoding apparatus according to claim 9, further comprising:
    combining means for combining the image data decoded by said decoding means with desired image data.

12. A method for coding comprising the steps of:
    a) inputting independent background image data corresponding to a predetermined background image and image data obtained by picking up an object with the predetermined background image;
    b) extracting object image data corresponding to the objection portion from the image data by using independent background image data; and
    c) motion compensation interpicture coding the object image data extracted by said extracting step, wherein the motion compensation interpicture coding performs motion compensation between the object image data of a present picture and the object image data of a picture other than the present picture.

13. A method for decoding comprising the steps of:
    a) inputting coded image data, which have been obtained by extracting object image data from image data and coding the extracted object image data by motion compensation interpicture coding, which performs motion compensation between the object image data of a present picture, and the object image data of a picture other than the present picture, the image data being data obtained by picking up an object with a predetermined background image, and the object image data being extracted from the image data by using an independent background image data corresponding to the predetermined background image obtained prior to the extraction process; and
    b) decoding the image data inputted in said input step.

* * * * *

UNITED STATES PATENT AND TRADEMARK OFFICE
CERTIFICATE OF CORRECTION

PATENT NO. : 6,188,726 B1
DATED : February 13, 2001
INVENTOR(S) : Yasuji Hirabayashi It is certified that error appears in the above-identified patent and that said Letters Patent is hereby corrected as shown below:

<u>Column 5,</u>
Line 31, delete "S1milarly" and insert -- Similarly --.

<u>Column 6,</u>
Line 60, delete "for inputting an image" and insert -- for providing said input image data --.

Signed and Sealed this

Thirtieth Day of July, 2002

*Attest:*

*Attesting Officer*

JAMES E. ROGAN
*Director of the United States Patent and Trademark Office*